(12) United States Patent
Cortes et al.

(10) Patent No.: US 9,605,594 B2
(45) Date of Patent: Mar. 28, 2017

(54) INJECTION DEVICE FOR A TURBINE ENGINE COMBUSTION CHAMBER

(75) Inventors: Thierry Cortes, Brunoy (FR); Laurent Bernard Cameriano, Avon (FR)

(73) Assignee: SNECMA, Paris (FR)

( * ) Notice: Subject to any disclaimer, the term of this patent is extended or adjusted under 35 U.S.C. 154(b) by 733 days.

(21) Appl. No.: 13/980,506

(22) PCT Filed: Jan. 25, 2012

(86) PCT No.: PCT/FR2012/050160
§ 371 (c)(1),
(2), (4) Date: Jul. 18, 2013

(87) PCT Pub. No.: WO2012/104523
PCT Pub. Date: Aug. 9, 2012

(65) Prior Publication Data
US 2013/0291546 A1 Nov. 7, 2013

(30) Foreign Application Priority Data
Jan. 31, 2011 (FR) ...................................... 11 50731

(51) Int. Cl.
*F02C 7/22* (2006.01)
*F23D 11/24* (2006.01)
*F23D 11/38* (2006.01)
*F23R 3/28* (2006.01)
*F23R 3/34* (2006.01)

(52) U.S. Cl.
CPC ................ *F02C 7/22* (2013.01); *F23D 11/24* (2013.01); *F23D 11/38* (2013.01); *F23R 3/28* (2013.01); *F23R 3/343* (2013.01)

(58) Field of Classification Search
CPC .. F23R 3/28; F23R 3/283; F23R 3/342; F23R 2900/00004; F23D 11/24; F23D 11/36; F23D 11/38; F02C 7/22
See application file for complete search history.

(56) References Cited

U.S. PATENT DOCUMENTS 6,543,235 B1 * 4/2003 Crocker ................ F23C 9/006
60/742
2004/0061001 A1 4/2004 Mao et al.
(Continued)

FOREIGN PATENT DOCUMENTS

| EP | 1 402 956 | 3/2004 |
| EP | 2 026 002 | 2/2009 |
| GB | 791 399 | 3/1958 |

OTHER PUBLICATIONS

International Search Report Issued Nov. 15, 2012 in PCT/FR12/50160 Filed Jan. 25, 2012.

*Primary Examiner* — Arun Goyal
(74) *Attorney, Agent, or Firm* — Oblon, McClelland, Maier & Neustadt, L.L.P.

(57) ABSTRACT

A fuel injection device for an annular combustion chamber of a turbine engine, the device including a pilot circuit feeding an injector, a multipoint circuit feeding injection orifices formed in a front face of an annular chamber, and an annular ring mounted in the annular chamber and including fuel-passing orifices opening out into the injection orifices, each fuel-passing orifice formed in the annular ring including a zone of small section that is extended at least downstream or upstream by an orifice portion of increasing section.

10 Claims, 2 Drawing Sheets

(56) References Cited

U.S. PATENT DOCUMENTS

| | | |
|---|---|---|
| 2009/0038312 A1 | 2/2009 | Hernandez et al. |
| 2009/0139240 A1* | 6/2009 | Rackwitz ............... F23R 3/343 60/740 |
| 2012/0186083 A1 | 7/2012 | Hernandez et al. |

* cited by examiner

INJECTION DEVICE FOR A TURBINE ENGINE COMBUSTION CHAMBER

BACKGROUND OF THE INVENTION

Field of the Invention

The present invention relates to a "multipoint" fuel injection device for an annular combustion chamber of a turbine engine such as an airplane turboprop or turbojet.

Description of the Related Art

In known manner, a turbine engine has an annular combustion chamber arranged at the outlet from a high-pressure compressor and provided with a plurality of fuel injection devices that are regularly distributed circumferentially at the inlet of the combustion chamber. A "multipoint" injection device has a Venturi with a pilot injector mounted therein centered on the axis of the Venturi and continuously fed with fuel by a pilot circuit, and a second Venturi that is coaxial around the first. The second Venturi has an annular chamber at its upstream end with an annular ring mounted therein that is fed with fuel by a fuel circuit. The ring has fuel injection orifices formed in its front face that faces downstream. These orifices open out downstream into orifices in a front wall of the annular chamber that themselves open out into the combustion chamber.

The pilot circuit supplies a continuous flow of fuel that is optimized for low speeds, and the multipoint circuit supplies an intermittent flow of fuel that is optimized for high speeds.

Nevertheless, intermittent use of the multipoint circuit has the major drawbacks resulting from the effect of high temperatures due to radiation from the flame in the combustion chamber of giving rise to stagnant fuel inside the multipoint circuit clogging or coking when the multipoint circuit is not in operation. These phenomena can lead to coke forming in the fuel injection orifices of the multipoint circuit thereby impeding or reducing the spraying of fuel by the multipoint circuit and thus impeding or reducing the operation of the combustion chamber.

In order to mitigate that drawback, document EP 2 026 002 in the name of the Applicant proposes using a fuel pilot circuit for cooling the multipoint circuit and reducing the formation of coke therein by means of two annular channels that are formed in the annular chamber radially on the outside and on the inside of the annular ring, these two channels having their outlets connected to the pilot injector. In document FR 09/04906, the Applicant has also proposed arranging thermal insulation means between the front face of the chamber and the front wall of the annular chamber. In another document FR 09/04907, the Applicant has proposed cooling the front face of the ring by diverting a fraction of the fuel from the inner or outer annular channels and causing it to flow between the front face of the annular ring and the front wall of the annular chamber.

Although those techniques reduce the coking of fuel in the vicinity of the orifices in the ring, that reduction is nevertheless not sufficient to guarantee good operation of the multipoint circuit.

Securing the annular ring inside the annular chamber and ensuring good sealing between the multipoint circuit and the pilot circuit make it necessary to provide welding or brazing between the front face of the ring and the front wall of the chamber. Thus, a zone of contact exists between the front face of the ring and the front wall of the chamber, thereby leading to good conduction of heat flux from the combustion flame towards the orifices in the ring and thus running the risk of forming coke when the multipoint circuit is not in operation.

BRIEF SUMMARY OF THE INVENTION

A particular object of the invention is to provide a solution to this problem that is simple, effective, and inexpensive.

To this end, the invention provides a fuel injection device for an annular combustion chamber of a turbine engine, the device comprising a pilot circuit continuously feeding an injector opening out into a first Venturi and a multipoint circuit intermittently feeding injection orifices formed in a front face of an upstream annular chamber of a second Venturi that is coaxial about the first Venturi, an annular ring being mounted in the annular chamber and including fuel-passing orifices opening out into the above-mentioned injection orifices, the device being characterized in that each fuel-passing orifice formed in the annular ring has a zone of small section extended at least downstream or upstream by a portion of increasing section.

Unlike the prior art, in which the orifices are holes of constant circular section, the fuel-passing orifices in the annular ring all have a respective zone of small section, of area that determines the fuel flow rate of the injectors, for given pressure. The orifice portions of increasing section serve to increase the volume available in each orifice for passing fuel, thereby limiting the formation of coke in the multipoint circuit. With the injection device of the invention, it is possible to conserve a fuel flow rate for the multipoint circuit that is identical to that of the prior art, while limiting the drawbacks due to fuel coking when the multipoint circuit is not in operation.

According to another characteristic of the invention, the portion of increasing section increases progressively to the upstream or downstream end of the orifice.

The small section zone may be formed at the upstream or at the downstream end of the orifice.

In a variant, the small section zone is formed between the upstream and downstream ends of the orifice and is extended by respective portions of section that increases going upstream and of section that increases going downstream.

In a particular embodiment of the invention, the small section zone is formed in a middle portion of the orifice.

The increasing-section orifice portion(s) may present a variety of profiles suitable for obtaining an increasing section. In particular, they may present a profile that is straight or else curved.

In an advantageous embodiment of the invention, the pilot circuit includes a circuit for cooling the annular ring, and means for thermally protecting the front face of the annular ring are interposed between the front face of the annular ring and the front face of the annular chamber.

In a first variant of this embodiment, the thermal protection means comprise means for thermally insulating the front face of the annular ring interposed between the front face of the annular ring and the front wall of the annular chamber.

In a second variant, the thermal insulation means are formed by a portion of the cooling circuit extending over the front face of the annular ring in the immediate vicinity of the injection orifices.

In either of the two preceding configurations, the invention takes advantage of the temperature reduction at the injection orifices of the ring resulting from the addition of cooling means or of thermal insulation means, thereby making it possible to further limit the formation of coke in the injection orifices.

The invention also provides an annular combustion chamber for a turbine engine that it includes at least one fuel injection device as described above. The invention also provides a turbine engine, such as a turbojet or a turboprop, that includes such a combustion chamber.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
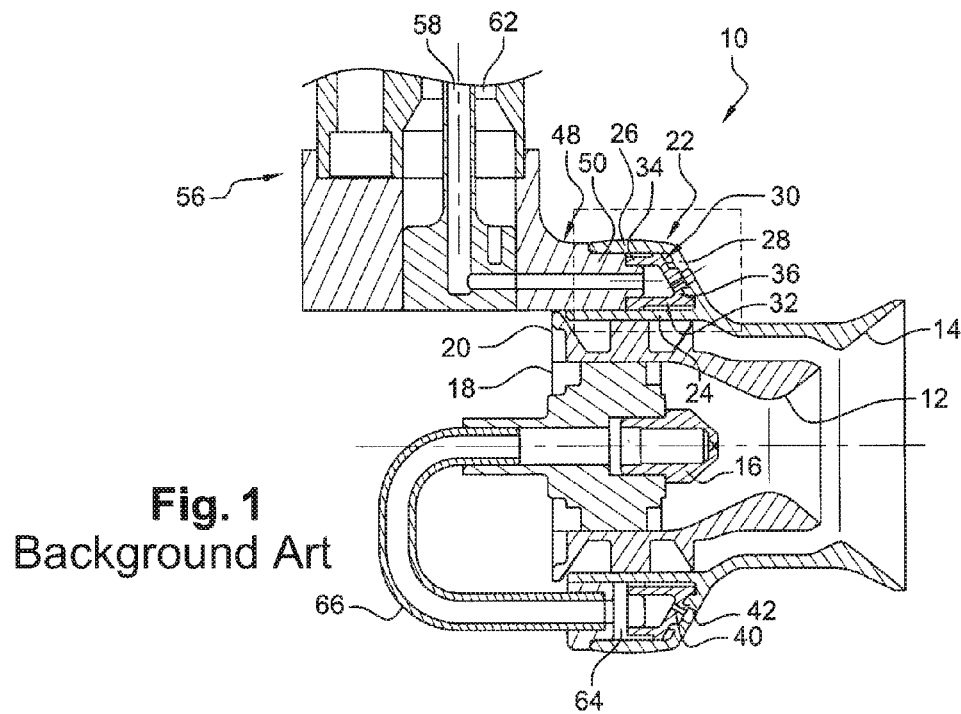
FIG. 1 is a fragmentary diagrammatic view in axial section of a multipoint fuel injection device of the prior art.

Reference is made initially to FIG. 1, which shows an injection device 10 of the prior art that comprises two fuel injector systems, one of which is a pilot system that operates continuously and the other of which is a multipoint system that operates intermittently. The device is for being mounted in an opening in an end wall of an annular combustion chamber of a turbine engine that is fed with air by an upstream high-pressure compressor, and from which the combustion gas drives a turbine connected downstream.

The device has a first Venturi 12 and a second Venturi 14, the Venturis being coaxial, the first Venturi 12 being mounted inside the second Venturi 14. A pilot injector 16 is mounted inside a first swirler stage 18 inserted axially inside the first Venturi 12. A second swirler stage 20 is formed at the upstream and radially outer end of the first Venturi 12 and lies between the first and second Venturis 12 and 14.

The second Venturi 14 has an annular chamber 22 defined by two cylindrical walls, a radially inner wall 24 and a radially outer wall 26, which walls are connected together by a frustoconical downstream wall 28 that converges downstream. An annular ring 30 also has two cylindrical walls, a radially inner wall 32 and a radially outer wall 34 that are connected together by a frustoconical downstream wall 36 that converges downstream and that is mounted inside the annular chamber 22 in such a manner that the downstream walls 28 and 36 of the annular chamber 22 and of the annular ring 30 are pressed one against the other.

The annular ring 30 and the annular chamber 22 are open at their upstream ends. The cylindrical walls 24 and 26 of the annular chamber 22 extend upstream beyond the upstream ends of the cylindrical walls 32 and 34 of the annular ring 30.

Figure 2:
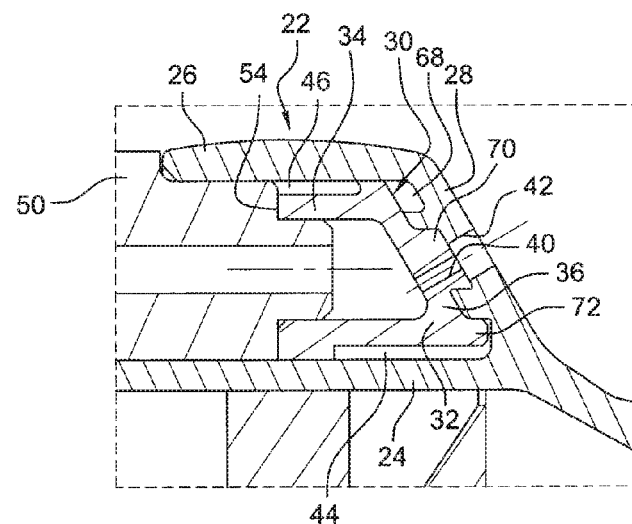
FIG. 2 is a diagrammatic view and on a larger scale of the zone in a dashed-line box in FIG. 1.

The downstream wall 36 of the annular ring 30 has cylindrical injection orifices 40 that are regularly distributed circumferentially and that open out into corresponding coaxial cylindrical orifices 42 of the downstream wall 28 of the annular chamber 22. The orifices 42 of the annular chamber 22 are of a diameter that is greater than the diameter of the orifices 40 of the annular ring 30 (FIG. 2).

An inner annular channel 44 for passing fuel is defined between the inner cylindrical walls 24 and 32 of the annular ring 30 and of the annular chamber 22. In similar manner, an outer annular channel 46 for passing fuel is defined between the outer cylindrical walls 26 and 34 of the annular ring 30 and of the annular chamber 22.

The injection device has a fuel delivery body 48 for delivering fuel with a downstream portion that is annular and that includes a cylindrical duct 50 that is axially engaged in leaktight manner between the inner and outer cylindrical walls 24 and 26 of the annular chamber 22 opening out in leaktight manner between the inner and outer cylindrical walls 32 and 34 of the annular ring 30. The duct 50 has a radial shoulder 54 that comes into abutment against the upstream ends of the inner and outer cylindrical walls 32 and 34 of the annular ring 30.

A fuel feed arm 56 is connected to the body 48 and has two coaxial ducts, an inner duct 58 feeding the duct 50 of the body 48 that opens out at its downstream end inside the annular ring 30 in order to feed the orifices 40 and 42, and an outer duct 62 that feeds channels (not shown) that open out into the inner and outer annular channels 44 and 46, respectively.

The body 48 has a fuel collector cavity 64 formed diametrically opposite from the fuel feed arm 56 and level with the upstream ends of the cylindrical walls 34 and 34 of the annular ring 30 so that the inner and outer annular channels 44 and 46 communicate with the collector cavity 64. A duct 66 is connected at one end to the pilot injector 16 and at the other end it opens out into the collector cavity 64.

In operation, the inner duct 58 of the arm 56 feeds fuel to the duct 50 of the body 48, the fuel then flowing in the annular ring 30 and being injected into the combustion chamber downstream via the orifices 40 and 42 of the ring 30 and of the chamber 22.

The outer duct 62 of the arm 56 feeds the channels of the body 48 that open out into the inner and outer annular channels 44 and 46, the fuel then passing into the collector cavity 64 in order to feed the pilot injector 16 via the duct 66.

The pilot circuit operates continuously, while the multipoint circuit operates intermittently during specific stages of flight that require maximum power, such as takeoff.

During the operation of the turbine engine, hot air from the high-pressure compressor, which may reach a temperature lying in the range 600° C. to 700° C., flows inside the first Venturi 12, through the first radial swirler 18, and air also flows inside the second radial swirler 20, between the first and second Venturis 12 and 14.

The inner and outer annular channels 44 and 46 through which the fuel feeding the pilot injector flows continuously form a cooling circuit radially outside and inside the annular ring 30, thereby avoiding the fuel coking in the ring 30 as a result of thermal radiation from the combustion, with this taking place during those stages of flight in which the multipoint circuit is not in operation.

As mentioned above, the downstream face 28 of the annular chamber 22 is subjected directly to thermal radiation from the combustion, and this can lead to the fuel coking in the injection orifices 40 and 42 of the ring 30 and of the annular chamber 22 during those stages of light in which the multipoint circuit is not in use.

In order to limit the increase in the temperature of the front face of the annular ring 30, thermal insulation means are arranged between the front face 36 of the ring 30 and the front wall 28 of the annular chamber 22.

These thermal insulation means comprise an annular cavity 68 formed between the front face 28 of the annular ring 30 and the downstream wall 28 of the annular chamber 22. This cavity 68 extends between the injection orifices 40 so as to provide thermal insulation as close as possible thereto, thus reducing the risks of fuel coking in the fuel injection orifices 42 in order to guarantee good operation of the multipoint circuit.

The front face 36 of the annular ring 30 has a plurality of projecting studs 70 that are regularly distributed around the ring 30, each having a respective injection orifice 42. These studs 70 are inserted in cavities in bulges in the upstream face of the downstream wall 28 of the annular chamber 22. The studs 70 are engaged inside these cavities so as to come into abutment against the downstream wall 28 of the annular chamber 22 in order to ensure that the ring 30 is properly axially positioned in the annular chamber 22. The studs 70 are substantially cylindrical in shape and they are brazed inside the cavities of the bulges in order to provide sealing between the pilot circuit and the multipoint circuit.

The outer cylindrical wall 34 of the ring 30 bears radially via an annular bead against the outer cylindrical wall 26 of the annular chamber 22 in order to center the ring 30 in the annular chamber 22. The front face 36 has an annular rim 72 extending downstream in line with the inner cylindrical wall 32. The downstream end of this annular rim 72 forms an annular fuel passage between the inner annular channel 44 and the front annular cavity 68.

The outer annular channel 46 is isolated from the front cavity 68 by the annular bead on the wall 34 of the ring 30 which may optionally be brazed to the outer cylindrical wall 26 of the annular chamber 22 so as to make a leaktight connection, if so desired. In operation, the fuel present inside the cavity 68 cokes under the effect of the heat flux, thereby forming thermal insulation that protects the annular ring 30.

As mentioned above, that type of device serves to limit the temperature rise of the front face 36 of the annular ring 30 and consequently limits the formation of coke while the multipoint circuit is not in operation. Nevertheless, making a junction between the front face 36 of the ring 30 and the front wall 28 of the annular chamber 22, via the studs 70, provides a heat bridge providing good conduction of heat from the combustion chamber, thereby encouraging coke to form in the orifices 40 of the ring 30.

The invention provides a solution to this problem by varying the section of the fuel-passing orifices formed in the annular ring 74 so that each orifice has a zone of small section extended by a portion of increasing section.

Figure 3:
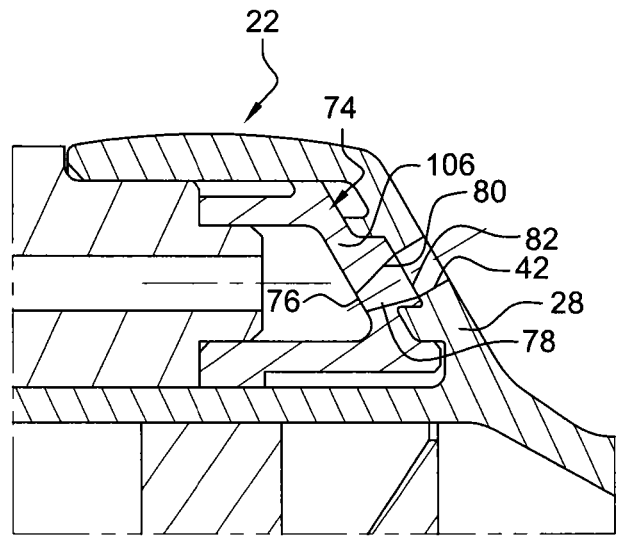
FIGS. 3 and 4 are diagrammatic views of two embodiments of a device of the invention.

In the first embodiment shown in FIG. 3, the small section 76 of each orifice 78 in the annular ring 74 is at the upstream end of the orifice 78 where the orifice 78 opens out into the inside of the annular ring 74. The inside surface 80 of each orifice 78 is conical, with its section increasing towards the downstream end of the orifice 78. The conical shape has a straight profile and is such that the diameter of the downstream section 82 of each orifice 78 is substantially equal to the diameter of the orifices 42 of the annular chamber 22.

This configuration presents the advantage of being simple to implement since machining the orifices 78 in the annular ring 74 to be conical in shape can be performed by inserting an appropriate tool through the orifices 42 of the annular chamber 22. Thus, such machining can be performed on an injector system in which the annular ring 74 is already mounted and secured inside the annular chamber 22. Finally, incorporating a portion of section that increases going towards the downstream end of the orifice forms a portion that is flared downstream and encourages the injection of fuel into the combustion chamber.

Figure 4:
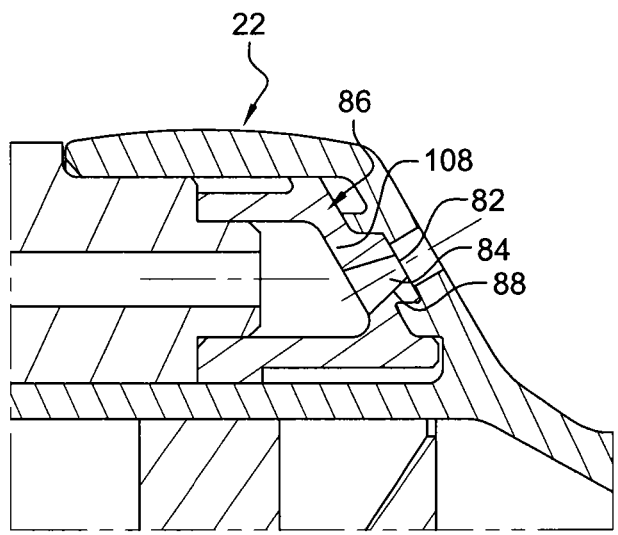

In a second embodiment of the invention as shown in FIG. 4, the small section 83 of each orifice 84 in the annular ring 86 is at the downstream end of the orifice 84. The inside surface 88 of each orifice 84 is conical with section that increases from the downstream end of the orifice 84 to its upstream end. This type of configuration is more difficult to make and requires machining techniques to be used that are more complex, such as laser drilling or electroerosion. The orifices 84 of section that increases going upstream needs to be made in the annular ring 86 before it is mounted inside the annular chamber 22. Nevertheless, compared with the above-described configuration (FIG. 3) this configuration presents the advantage of reducing the exposure of the inside surfaces 88 of the orifices 84 in the ring 86 to radiation from the combustion flame.

Figure 5:
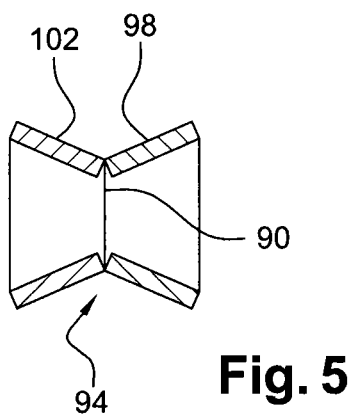
FIGS. 5 and 6 are diagrammatic views of variant embodiments of the invention.
Figure 6:
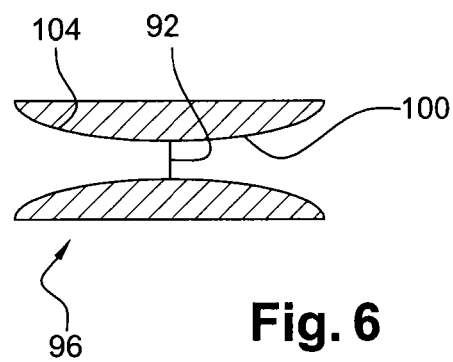

In two other embodiments of the invention as shown in FIGS. 5 and 6, the small section 90, 92 is formed between the upstream and downstream ends of each orifice 94, 96 in the annular ring, and it is formed in a middle portion of the orifice. In these embodiments, each orifice 94, 96 has a portion 98, 100 of section that increases going downstream and a portion 102, 104 of section that increases going upstream. Each portion of increasing section may have a conical shape 98, 102 (FIG. 5) or its profile may be curved 100, 104 (FIG. 6). With a curved profile, it should be observed that the curved surfaces 100, 104 are convex. These surfaces could equally well be concave.

In other variants of the invention, the walls of the orifices in the ring as shown in FIGS. 3 and 4 may have a profile that is curved, being concave or convex.

In a practical embodiment of the invention, the small section of each orifice in the annular ring has an area lying in the range bout $5 \times 10^{-6}$ square meters (m$^2$) to $10 \times 10^{-6}$ m$^2$ for a mass flow rate of fuel in the multipoint circuit lying in the range approximately 1 gram per second (g/s) to 2 g/s.

Thus, modifying the profiles of the orifices 78, 84, 94, 96 in such a manner as to have a small section and at least one portion of increasing section makes it possible to reduce the impact of any formation of coke in the orifices of the annular ring since the volume of each orifice 78, 84, 94, 96 in the annular ring is greater than the volume of orifices in the prior art. This serves to guarantee good operation of the multipoint circuit.

In the description made with reference to the drawings, the injection device includes means for thermally insulating the front face 106, 108 of the annular ring 74, 86. Nevertheless, the invention is also applicable to an injection device that does not have thermal insulation means but rather has means for cooling the front face of the annular ring. For this purpose, the cooling circuit formed by the inner and outer channels 44 and 46 extends over the front face of the chamber in the vicinity of the injection orifices of the ring. In such a configuration, a portion of the cooling circuit is formed by a groove in the downstream face of the annular ring, this downstream face being pressed against the front face of the annular chamber. The downstream circuit may be in fluid flow communication with the inner channel or with the outer channel and it may be undulating so as to extend radially in alternation towards the inside and towards the outside of the injection orifices in the annular ring so as to position the orifices as close as possible to the injection orifices. Such a configuration for the cooling circuit is described in detail in application FR 09/04907 in the name of the Applicant.

Although the invention is particularly advantageous when it is used in combination with cooling means or with thermal insulation means for the front face as described above, it can also be used in a device that does not have such means.

Thus, the front face of the annular ring may be in contact over its entire area with the front face of the annular chamber. The injection device of the invention may also optionally include a circuit for cooling the annular ring by causing the fuel of the pilot circuit to flow in inner or outer annular channels as described above.

The invention claimed is:

1. A fuel injection device for an annular combustion chamber of a turbine engine, the device comprising:
   a pilot circuit continuously feeding an injector opening out into a first Venturi;
   a multipoint circuit intermittently feeding injection orifices formed in a front face of an upstream annular chamber of a second Venturi that is coaxial about the first Venturi; and
   an annular ring mounted in the annular chamber and including fuel-passing orifices opening out into the injection orifices,
   wherein each of the fuel-passing orifices formed in the annular ring includes a zone of small cross-section extended at least downstream or upstream by a portion of increasing cross-section, and
   wherein the pilot circuit includes a circuit for cooling the annular ring, and further comprising a gap interposed between a front face of the annular ring and a front face of the annular chamber for thermally protecting the front face of the annular ring.

2. A device according to claim 1, wherein the portion of increasing cross-section increases progressively to upstream or downstream ends of the fuel-passing orifices.

3. A device according to claim 1, wherein the zone of small cross-section is formed at an upstream or downstream end of the fuel-passing orifices.

4. A device according to claim 1, wherein the zone of small cross-section is formed between upstream and downstream ends of the fuel-passing orifices and is extended by respective portions of section that increases going upstream and of section that increases going downstream.

5. A device according to claim 4, wherein the zone of small cross-section is formed in a middle portion of the fuel-passing orifices.

6. A device according to claim 1, wherein the portion of increasing cross-section has a profile that is straight or curved.

7. A device according to claim 1, wherein the gap is in fluid communication with a portion of the cooling circuit extending over the front face of the annular ring in an immediate vicinity of the injection orifices.

8. An annular combustion chamber of a turbine engine, comprising at least one fuel injection device according to claim 1.

9. A turbine engine, a turbojet, or a turboprop, comprising a combustion chamber according to claim 8.

10. A device according to claim 1, wherein the annular chamber includes a first radially inner wall and a first radially outer wall connected together by a first frustoconical downstream wall,
    the annular ring includes a second radially inner wall and a second radially outer wall connected together by a second frustoconical downstream wall,
    the first frustoconical downstream wall abuts the second frustoconical downstream wall, and
    the injection orifices are provided in the first frustoconical downstream wall and the fuel-passing orifices are provided in the second frustoconical downstream wall.

* * * * *